… … …
United States Patent Office 2,695,891
Patented Nov. 30, 1954

2,695,891
PROCESS FOR BREAKING PETROLEUM EMULSIONS

Melvin De Groote, University City, Mo., assignor to Petrolite Corporation, Wilmington, Del., a corporation of Delaware No Drawing. Application September 19, 1952, Serial No. 310,555

32 Claims. (Cl. 252—344)

This invention relates to processes or procedures particularly adapted for preventing, breaking or resolving emulsions of the water-in-oil type, and particularly petroleum emulsions.

The present invention is a continuation-in-part of my co-pending applications, Serial Nos. 288,746, filed May 19, 1952, 296,087, filed June 27, 1952, and 301,807, filed July 30, 1952.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The demulsifying agents employed in the present demulsifying process are the products obtained by the process of first condensing (a) an oxyalkylation-susceptible, fusible, non-oxygenated organic solvent-soluble, water-insoluble, low-stage phenolaldehyde resin of the type described hereinafter in Part 1; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible. The condensation reaction is followed by an oxyalkylation step by means of an alpha-beta alkylene oxide having not more than 4 carbon atoms and selected from the class consisting of ethylene oxide, propylene oxide, butylene oxide, glycide and methylglycide to form the present demulsifying agents.

In many instances and for various purposes, particularly for the resolution of petroleum emulsions of the water-in-oil type, one may combine a comparatively large proportion of the alkylene oxide, particularly propylene oxide or a combination of propylene oxide and ethylene oxide, with a comparatively small proportion of the resin condensate. In some instances the ratio by weight has been as high as 50-to-1, i. e., the ultimate product of reaction contained approximately 2% of resin condensate and approximately 98% of alkylene oxide.

This invention in a more limited aspect as far as the reactants are concerned which are subjected to oxyalkylation are certain amine-modified thermoplastic phenol-aldehyde resins. Such amine-modified resins are described in the aforementioned co-pending applications and much that is said herein is identical with the text of said aforementioned co-pending applications; however, some detail is omitted since the art is aware of these resins through my mentioned co-pending applications, e. g. Serial No. 296,087. For purpose of simplicity the invention, purely from a standpoint of the resin condensate involved, may be exemplified by an idealized formula as follows:

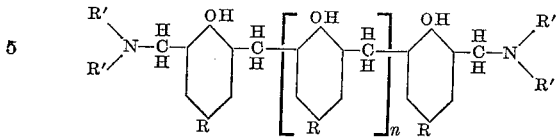

in which R represents an aliphatic hydrocarbon substituent generally having four and not over 18 carbon atoms but most preferably not over 14 carbon atoms, and n generally is a small whole number varying from 1 to 4. In the resin structure it is shown as being derived from formaldehyde although obviously other aldehydes are equally satisfactory. The amine residue in the above structure is derived from either a substituted imidazoline or a substituted tetrahydropyrimidine as previously specified and may be indicated thus:

in which HN< represents a reactive secondary amino group and two occurrences of R' represent the remainder of the molecule. Stated another way, what has been depicted in the above formula is an over-simplification as far as the ring compound is concerned which is obvious by reference to a more elaborate formula depicting the actual structure of typical members of the group, such as:

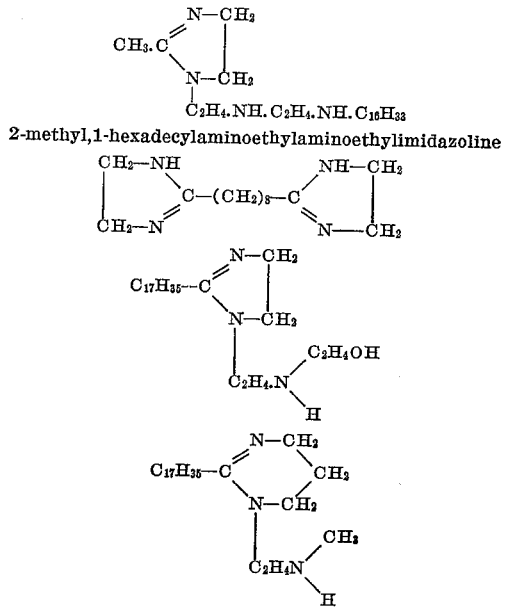

2-heptadecyl,1-methylaminoethyl tetrahydropyrimidine

The introduction of two such ring compound radicals into a comparatively small resin molecule, for instance, one having 3 to 6 phenolic nuclei as specified, alters the product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect. In such instances where there are hydroxyl groups present, needless to say there is a further hydrophile effect introduced.

I am not aware that it has been previously suggested to modify by oxyalkylation the resin condensates of the kind described herein and in my co-pending application, S. N. 296,087. The condensation product obtained according to the present invention is heat stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

Any reference, as in the hereto appended claims, to the procedure employed in the process is not intended to limit the method or order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

Since the amines herein employed are nonhydroxylated it is obvious the amine-modified resin is susceptible to oxyalkylation by virtue of the phenolic hydroxyl radicals. Referring to the idealized formula which appeared previously it is obvious the oxyalkylated derivatives, or at least a substantial portion of time, could be indicated in the following manner:

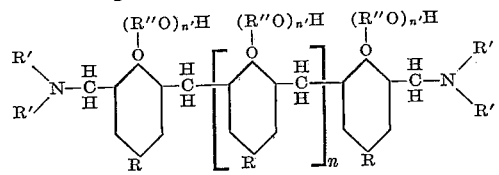

in which R"O is the radical of alkylene oxide, such as the ethoxy, propoxy or similar radicals derived from ethylene oxide, propylene oxide, glycide or the like, and $n'$ is a number varying from 1 to 60, with the proviso that one need not oxyalkylate all the available phenolic hydroxyl radicals. In other words, one need only convert two phenolic hydroxyl radicals per resin molecule. Stated another way, $n'$ can be zero as well as a whole number subject to what has been immediately preceding, all of which will be considered in greater detail subsequently.

Actually what has been said previously is not as complete an idealized presentation as is desirable due to another factor involved. The factor is this; since the substituted imidazoline or substituted tetrahydropyrimidine may have a hydroxyl group or a tertiary amine group which is not susceptible to oxyethylation, it may also have more than one secondary group and thus the cyclic amine residue per se may be susceptible to oxyalkylation at one or more points of reaction due to a labile hydrogen atom attached to nitrogen or attached to oxygen. Actually, it is difficult to state in general terms what the susceptibility of the secondary nitrogen group is under the conditions described for reasons which are obscure.

Briefly stated, oxyalkylation seems to take place readily at terminal secondary amino groups but less readily, and sometimes hardly at all, when the same group appears in the center of a large molecule. In the instant situation there are phenolic hydroxyl groups available which are readily susceptible to oxyalkylation and also there may be present hydroxyl groups as part of the cyclic amine residue. If one assumes for the moment the cyclic amine residue contains at least one or possibly two points of oxyalkylation susceptibility then the condensate, ignoring any attempt to show an actual ring, can be depicted more satisfactorily by first referring to the resin condensate and then to the oxyalkylated derivative.

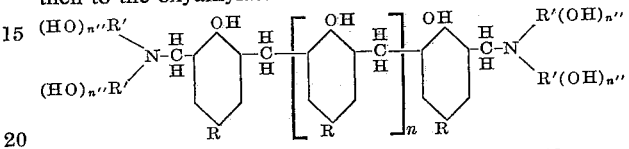

in which the characters have their previous significance, and $n''$ is the integer 0 or a small whole number, with the proviso that in each terminal amino radical there must be at least one hydroxyl group.

Thus one can show and with all propriety assume that to some extent even at the initial stage, oxyalkylation does take place in reaction of the kind described, not only at the phenolic hydroxyl but also at the hydroxyls which are part of the amino radical. This can be depicted in the following manner:

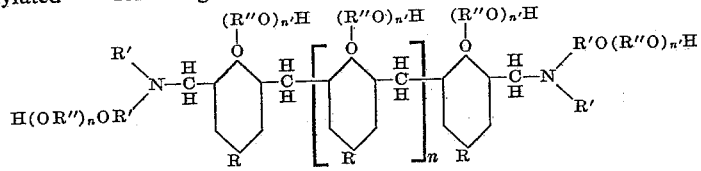

in which for simplicity the formula just shown has been limited to the specific instance where there is one oxyalkylation-susceptible hydroxyl radical present as part of the cyclic amine residue.

Assuming, however, the cyclic residue does not have a labile hydrogen attached oxygen but does have a labile hydrogen attached to nitrogen, then the derivative to be oxyalkylated may be indicated thus:

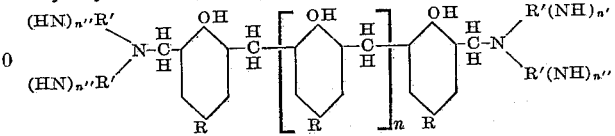

Similarly, going to the oxyalkylated product and following through the assumption just made in regard to the resin condensate the idealized formula may be presented thus:

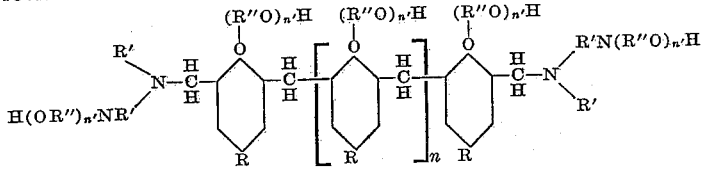

The characters in the two previous formulas have the same significance as previously and no further elaboration is required.

As stated, in the above formulas R"O is the radical of an alkylene oxide such as ethoxy, propoxy, or similar radicals derived from ethylene oxide, propylene oxide, glycide or the like, and $n'$ is a number varying from 1 to 60, with the proviso that one need not oxyalkylate all the available phenolic hydroxyl radicals or all the available amino hydrogen atoms to the extent they are present. In other words, one need convert only two labile hydrogen radicals per condensate. It is immaterial whether the labile hydrogen atoms be attached to oxygen or nitrogen.

As far as the use of the herein described ultimate products goes for purpose of resolution of petroleum emulsions of the water-in-oil type, I particularly prefer to use those which as such merely as a result of oxyalkylation alone or in the form of the free base or hydrate, i. e., combination with water or particularly in the form of a low molal organic acid such as the acetate or hydroxy acetate, have sufficiently hydrophile character to at least meet the test set forth in U. S. Patent No. 2,499,368, dated March 7, 1950, to De Groote et al. In some instances oxyalkylation is the controlling factor rather than the basic nitrogen atoms present regardless of their structure or combination. In said patent such test for emulsification using a water-insoluble solvent, generally xylene, is described as an index of surface activity.

In the present instance the various oxyalkylated condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

Reference is again made to U. S. Patent 2,499,368 dated March 7, 1950, to De Groote and Keiser. In said immediately aforementioned patent the following test appears:

"The same is true in regard to the oxyalkylated resins herein specified, particularly in the lower stage of oxyalkylation, the so-called 'sub-surface-active' stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

"If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

"In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

"In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

"The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

"Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion."

Having described the invention briefly and not necessarily in its most complete aspect, the text immediately following will be a more complete description with specific reference to reagents and the method of manufacture.

For convenience the subsequent text will be divided into five parts:

Part 1 is concerned with the general structure of the amine-modified resin condensates and also the resin itself, which is used as a raw material;

Part 2 is concerned with appropriate cyclic amidines selected from the class consisting of substituted imidazolines and substituted tetrahydropyrimidines in which there is present at least one basic secondary amino radical and characterized by freedom from any primary amino radical;

Part 3 is concerned with the condensation reactions involving the resin, the amine, and formaldehyde to produce the specific products or compounds;

Part 4 is concerned with the oxyalkylation of the products described in Part 3, preceding; and Part 5 is concerned with the use of the oxyalkylated amine-modified resins obtained as described in Part 4, preceding, for use in the resolution of emulsions of the water-in-oil type.

In the subsequent text, Parts 1, 2 and 3 appear in substantially the same form as in the text of the aforementioned co-pending applications, Serial Nos. 288,746 filed May 19, 1952, 296,087, filed June 27, 1952, and 301,807 filed July 30, 1952. Furthermore, Part 4 is essentially the same as Part 4 in the last aforementioned co-pending application, Serial No. 301,807, filed July 30, 1952.

PART 1

It is well known that one can readily purchase on the open market, or prepare, fusible, organic solvent-soluble, water-insoluble resin polymers of a composition approximated in an idealized form by the formula

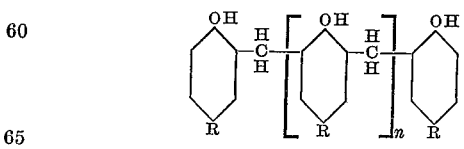

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance para-phenylphenol, one may obtain a resin which is not soluble in a nonoxygenated solvent, such as benzene, or xylene, but requires an oxygenated solvent such as a low molal alcohol, dioxane, or diethylglycol diethylether. Sometimes a mixture of the two solvents (oxygenated and non-oxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368 dated March 7, 1950, to De Groote and Keiser. In said patent there are described oxyalkylation-susceptible, fusible, nonoxygenated-organic solvent-soluble, water-insoluble, low-stage phenol-aldehyde resins having an average molecular weight corresponding to at least 3 and not over 6 phenolic nuclei per resin molecule. The phenol aldehyde resins are difunctional only in regard to methylol-forming reactivity, and the resins are derived by reaction between a difunctional monohydric phenol and an aldehyde having not over 8 carbon atoms and reactive toward the phenol. Also, the resins are formed in the substantial absence of trifunctional phenols. The phenol constituent of the resins is of the formula

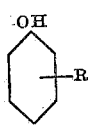

in which R is an aliphatic hydrocarbon radical having at least 4 carbon atoms and not more than 24 carbon atoms and substituted in the 2,4,6 position.

If one selected a resin of the kind just described previously and reacted approximately on mole of the resin with two moles of formaldehyde and two moles of a cyclic amidine as specified, following the same idealized over-simplification previously referred to, the resultant product might be illustrated thus:

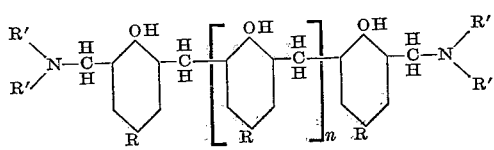

The basic amine may be designated thus:

subject to what has been said previously as to the presence of a substituted imidazoline or a substituted tetrahydropyrimidine radical having at least one basic secondary amino radical present and that the ring compound, or rather the two occurrences of R' jointly with N, be free from a primary amine radical. However, if one attempts to incorporate into the formula

a structure such as a substituted imidazoline or substituted tetrahydropyrimidine such as the following:

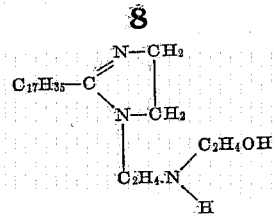

then one becomes involved in added difficulties in presenting an overall picture. Thus, for sake of simplicity the ring compound having the reactive secondary amino group will be depicted as

subject to the limitation and explanation previously noted.

In conducting reactions of this kind one does not necessarily obtain a hundred per cent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

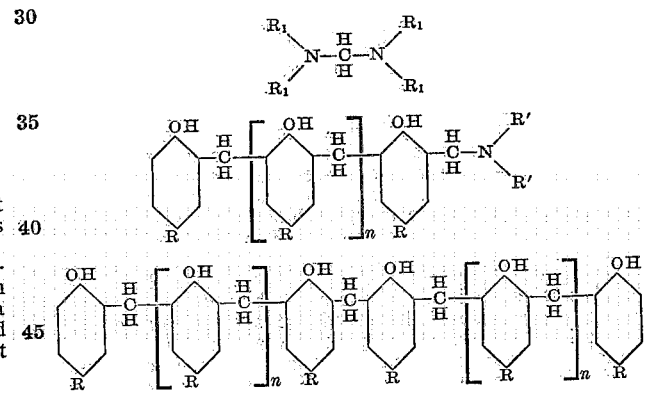

As has been pointed out previously, as far as the resin unit goes one can use a mole of aldehyde other than formaldehyde, such as acetaldehyde, propionaldehyde or butyraldehyde. The resin unit may be exemplified thus:

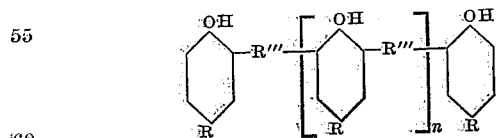

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Example No. | R | Position of R | R'' derived from— | $n$ | Mol. wt. of resin molecule |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |

PART 2

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages may be substitued. Needless to say, these compounds include members in which the substituents also may have one or more nitrogen atoms, either in the form of amino nitrogen atoms or in the form of acylated nitrogen atoms.

These cyclic amidines are sometimes characterized as being substiuted imidazolines and tetrahydropyrimidines in which the two-position carbon of the ring is generally bonded to a hydrocarbon radical or comparable radical derived from an acid, such as a low molal fatty acid, a high molal fatty acid, or comparable acids such as poly-carboxy acids.

Cyclic amidines obtained from oxidized wax acids are described in detail in co-pending Blair application, Serial No. 274,075, filed February 28, 1952. Instead of being derived from oxidized wax acids, the cyclic compounds herein employed may be obtained from any acid from acetic acid upward, and may be obtained from acids, such as benzoic, or acids in which there is a reoccurring ether linkage in the acyl radical. In essence then, with this difference said aforementioned co-pending Blair application, Serial No. 274,075, describes compounds of the following structure:

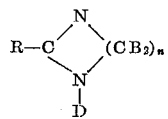

where R is a member of the class consisting of hydrocarbon radicals having up to approximately 30 carbon atoms and includes hydroxylated hydrocarbon radicals and also hydrocarbon radicals in which the carbon atom chain is interrupted by oxygen; $n$ is the numeral 2 to 3, D is a member of the class consisting of hydrogen and organic radicals containing less than 25 carbon atoms, composed of the elements from the group consisting of C, N, O and H, and B is a member of the group consisting of hydrogen and hydrocarbon radicals containing less than 7 carbon atoms, with the proviso that at least three occurrences of B are hydrogen.

The preparation of an imidazoline substituted in the two-position by lower aliphatic hydrocarbon radicals is described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form basic nitrogen-containing compounds of the present invention include polyalkylene polyamines such as ethylene-diamine, diethylenetriamine, triethylenetetramine, tetraethylenepentamine, and higher polyethylene polyamines, and also including 1,2-diaminopropane, N-ethylethylene diamine, N,N-dibutyldiethylenetriamine, 1,2 - diaminobutane, hydroxyethylethylenediamine, 1,2-propylenetriamine, and the like.

For details of the preparation of imidazolines substituted in the 2-position from amines of this type, see the following U. S. patents: U. S. No. 1,999,989 dated April 30, 1935, Max Bockmuhl et al.; U. S. No. 2,155,877 dated April 25, 1939, Edmund Waldmann et al.; and U. S. No. 2,155,878 dated April 25, 1939, Edmund Waldmann et al. Also see Chem. Rev., 32, 47 (43).

Equally suitable for use in preparing compounds of my invention and for the preparation of tetrahydropyrimidines substituted in the 2- position are the polyamines containing at least one primary amino group and at least one secondary amino group, or another primary amino group separated from the first primary amino group by three carbon atoms. This reaction is generally carried out by heating the reactants to a temperature of 230° C. or higher, usually within the range of 250° C. to 300° C., at which temperatures water is evolved and ring closure is effected. For details of the preparation of tetrahydropyrimidines, see German Patent No. 700,371 dated December 18, 1940, to Edmund Waldmann and August Chwala; German Patent No. 701,322 dated January 14, 1941, to Karl Kiescher, Ernst Urech and Willi Klarer; and U. S. Patent No. 2,194,419 dated March 19, 1940, to August Chwala.

Examples of amines suitable for this synthesis include 1,3-propylenediamine, trimethylenediamine, 1,3-diaminobutane, 2,4-diaminopentane, M - ethyl - trimethylenediamine, N-aminoethyltrimethylene diamine, aminopropyl stearylamine, tripropylenetramine, tetrapropylene pentamine, high boiling polyamines prepared by the condensation of 1,3-propylene dichloride with ammonia, and similar diamines or polyamines in which there occurs at least one primary amino group separated from another primary or secondary amino group by three carbon atoms.

Similarly, the same class of materials are included as intial reactants in co-pending Smith application, Serial No. 281,645, filed April 10, 1952. Said application in essence states that the cyclic compounds employed may be derived from either polyamines in which the nitrogen atoms are separated by an ethylene radical or by a trimethylene radical. Reference to a propylene radical means a methyl substituted ethylene radical, i. e., having only 2 carbon atoms between nitrogen atoms. From a practical standpoint, as will be explained hereinafter, the polyethylene imidazolines are most readily available and most economical for use. Thus, broadly speaking, using the same terminology as said Smith application, Serial No. 281,645, the present invention is concerned with a condensation reaction, in which one class of reactants are subsituted ring compounds consisting of:

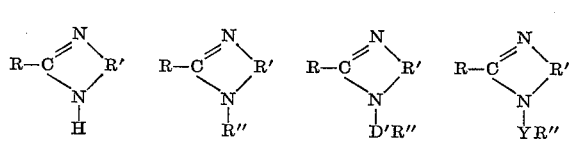

in which R' is a divalent alkylene radical selected from the class consisting of $$-CH_2CH_2-$$

$$-CH_2CH_2CH_2-$$

$$-\underset{CH_3}{\underset{|}{C}}-CH_2-$$
$$\phantom{-}H$$

(shown with H above C)

$$-CH_2-\underset{CH_3}{\underset{|}{CH}}-CH_2-$$

and in which D' represents a divalent, non-amino, organic radical containing less than 25 carbon atoms, composed of elements from the group consisting of C, H, O, and n; Y represents a divalent, organic radical containing less than 25 carbon atoms, composed of elements from the group consisting of C, H, O, and N, and containing at least one amino group, and R is a member of the class consisting of hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R'' is a member of the class consisting of hydrogen, aliphatic radicals and cycloaliphatic radicals, with the proviso that in the occurrence of the radicals R and R'' there be present at least one group of 8 to 32 uninterrupted carbon atoms. In the present instance, however, there is no limitation in regard to the radicals R and R''.

What has been said previously in regard to the two above copending applications as far as substituted imidazolines are concerned is substantially the same as appears in Blair and Gross Reissue Patent No. 23,227, reissued May 9, 1950, and Monson Patent No. 2,589,198 dated April 11, 1952.

As to the six-membered ring compounds generally referred to as substituted pyrimidines, and more particularly as substituted tetrahydropyrimidines, see U. S. Patent No. 2,534,828 dated December 19, 1950, to Mitchell et al. With the modification as far as the instant application goes, the hydrocarbon group R may have the same variation as when it is part of the five-membered ring previously referred to and is not limited to an alkyl group having at least 10 carbon atoms as in the instance of the aforementioned U. S. Patent No. 2,534,828.

For the purpose of the present invention there is selected from the broad case of compounds previously described such members as meet the following limitations: (a) Have present at least one basic secondary amino radical; and (b) be free from primary amino groups and especially basic primary amino groups. Such compounds may have two-ring membered radicals present instead of one ring-membered radical and may or may not have present a tertiary amine radical or a hydroxyl radical, such as a hydroxy alkyl radical. A large number of compounds have been described in the literature meeting the above specifications, of which quite a few appear in the aforementioned issued U. S. patents. Examples selected from the patents include the following:

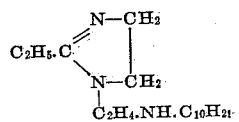

2-undecylimidazoline (1)

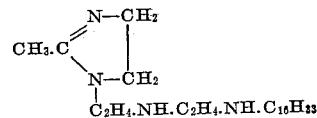

2-heptadecylimidazoline (2)

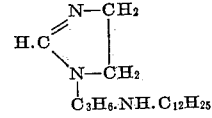

2-oleylimidazoline (3)

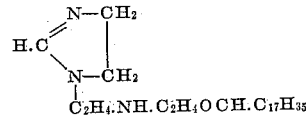

1-N-decylaminoethyl,2-ethylimidazoline (4)

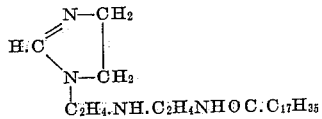

2-methyl,1-hexadecylaminoethylaminoethylimidazoline (5)

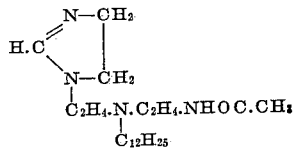

1-dodecylaminopropylimidazoline (6)

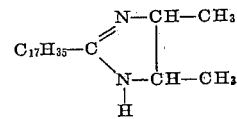

1-(stearoyloxyethyl)aminoethylimidazoline (7)

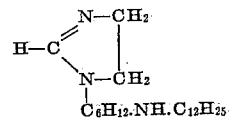

1-stearamidoethylaminoethylimidazoline (8)

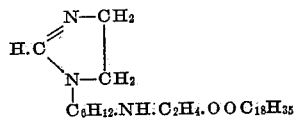

1-(N-dodecyl)-acetamidoethylaminoethylimidazoline (9)

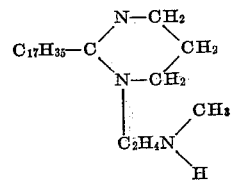

2-heptadecyl,4,5-dimethylimidazoline (10)

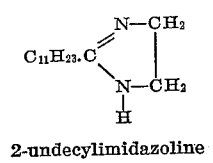

1-dodecylaminohexylimidazoline (11)

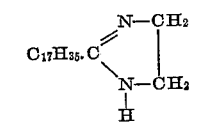

1-stearoyloxyethylaminohexylimidazoline (12)

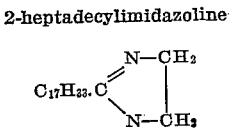
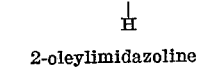

2-heptadecyl,1-methylaminoethyl tetrahydropyrimidine (13)

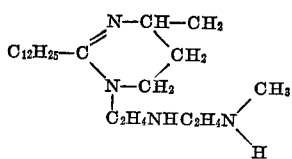

4-methyl,2-dodecyl,1-methylaminoethylaminoethyl tetrahydropyrimidine

As has been pointed out previously, the reactants herein employed may have two substituted imidazoline rings or two substituted tetrahydropyrimidine rings. Such compounds are illustrated by the following formula

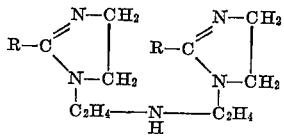

Such compounds can be derived, of course, from triethylenetetramine, tetraethylenepentamine, pentaethylenehexamine, and higher homologues. The substituents may vary depending on the source of the hydrocarbon radical, such as the lower fatty acids and higher fatty acids, a resin acid, naphthenic acid, or the like. The group introduced may or may not contain a hydroxyl radical as in the case of hydroxyacetic acid, acetic acid, ricinoleic acid, oleic acid, etc.

One advantage of a two-ring compound resides in the fact that primary amino groups which constitute the terminal radicals of the parent polyamine, whether a polyethylene amine or polypropylene amine, are converted so as to eliminate the presence of such primary amino radicals. Thus, the two-membered ring compound meets the previous specification in regard to the nitrogen-containing radicals.

Another procedure to form a two-membered ring compound is to use a dibasic acid. Suitable compounds are described, for example, in aforementioned U. S. Patent No. 2,194,419, dated March 19, 1940, to Chwala.

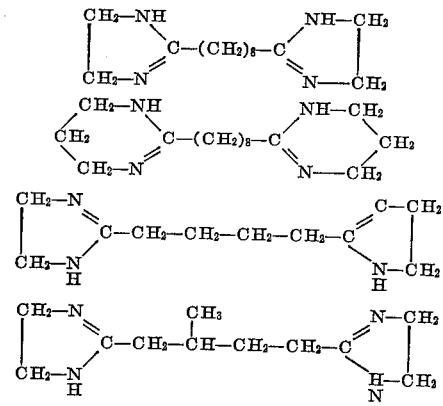

As to compounds having a tertiary amine radical, it is obvious that one can employ derivatives of polyamines in which the terminal groups are unsymmetrically alkylated. Initial polyamines of this type are illustrated by the following formula:

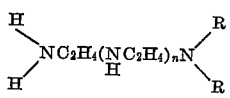

in which R represents a small alkyl radical such as methyl, ethyl, propyl, etc., and $n$ represents a small whole number greater than unity such as 2, 3 or 4. Substituted imidazolines can only be formed from that part of the polyamine which has a primary amino group present. There is no objection to the presence of a tertiary amine radical as previously pointed out. Such derivatives, provided there is more than one secondary amino radical present in the ring compound, may be reacted with an alkylene oxide, such as ethylene oxide, propylene oxide, glycide, etc., so as to convert one or more amino nitrogen radicals into the corresponding hydroxy alkyl radical, provided, however, that there is still a residual secondary amine group. For instance, in the preceding formula if $n$ represents 4 it means the ring compound would have two secondary nitrogen radicals and could be treated with a single mole of an alkylene oxide and still provide a satisfactory reactant for the herein described condensation reaction.

Ring compounds, such as substituted imidazolines, may be reacted with a substantial amount of alkylene oxide as noted in the preceding paragraph and then a secondary amino group introduced by two steps; first, reaction with an ethylene imine, and second, reaction with another mole of the oxide, or with an alkylating agent such as dimethyl sulfate, benzyl chloride, a low molal ester of a sulfonic acid, an alkyl bromide, etc.

As to oxyalkylated imidazolines and a variety of suitable high molecular weight carboxy acids which may be the source of a substituent radical, see U. S. Patent No. 2,468,180, dated April 26, 1949, to De Groote and Keiser.

Other suitable means may be employed to eliminate a terminal primary amino radical. If there is additionally a basic secondary amino radical present then the primary amino radical can be subjected to acylation notwithstanding the fact that the surviving amino group has no significant basicity. As a rule acylation takes place at the terminal primary amino group rather than at the secondary amino group, thus one can employ a compound such as

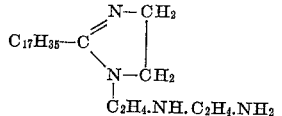

2-heptadecyl,1-diethylenediaminoimidazoline and subject it to acylation so as to obtain, for example, acetylated 2-heptadecyl,1-diethylenediaminoimidazoline of the following structure:

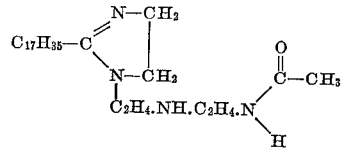

(15)

Similarly, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as,

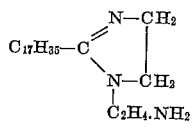

2-heptadecyl,1-aminoethylimidazoline which can be reacted with a single mole of ethylene oxide, for example, to produce the hydroxy ethyl derivative of 2-heptadecyl,1-aminoethylimidazoline, which can be illustrated by the following formula:

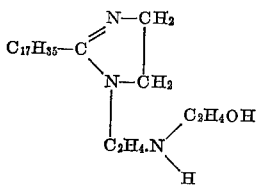

(16)

Other reactants may be employed in connection with an initial reactant of the kind described above, to wit, 2-heptadecyl,1-aminoethylimidazoline; for instance, reaction with an alkylene imine such as ethylene imine, propylene imine, etc. If reacted with ethylene imine the net result is to convert a primary amino radical into a secondary amino radical and also introduces a new primary amino group. If ethylene imine is employed, the net result is simply to convert 2-heptadecyl,1-aminoethylimidazoline into 2-heptadecyl, 1-diethylenediaminoimidazoline. However, if propylene imine is used the net result is a compound which can be considered as being derived hypothetically from a mixed polyalkylene amine, i. e., one having both ethylene groups and a propylene group between nitrogen atoms.

A more satisfactory reactant is to employ one obtained by the reaction of epichlorohydrin on a secondary alkyl amine, such as the following compound:

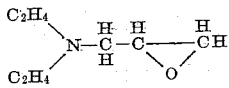

If a mole of 2-heptadecyl,1-aminoethylimidazoline is reacted with a mole of the compound just described, to wit,

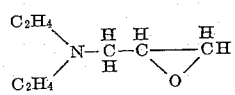

the resultant compound has a basic secondary amino group and a basic tertiary amino group. See U. S. Patent No. 2,520,093 dated August 22, 1950, to Gross.

For the purpose of convenience, what has been said by direct reference is largely by way of illustration in which there is present a sizable hydrophobe group, for instance, heptadecyl groups, pentadecyl groups, octyl groups, nonyl groups, etc. etc.

As has been pointed out, one can obtain all these comparable derivatives from low molal acids, such as acetic, propionic, butyric, valeric, etc. Similarly, one can employ hydroxy acids such as glycolic acids, lactic acid, etc. Over and above this, one may employ acids which introduce a very distinct hydrophobe effect as, for example, acids prepared by the oxyethylation of a low molal alcohol, such as methyl, ethyl, propyl, or the like, to produce compounds of the formula $$R(OCH_2CH_2)_nOH$$

in which R is a low molal group, such as methyl, ethyl or propyl, and $n$ is a whole number varying from one up to 15 or 20. Such compounds can be converted into the alkoxide and then reacted with an ester of chloracetic, followed by saponification so as to yield compounds of the type $R(OCH_2CH_2)_nOCH_2COOH$ in which $n$ has its prior significance. Another procedure is to convert the compound into a halide ether such as in $R(OCH_2CH_2)_nCl$ in which $n$ has its prior significance, and then react such halide ether with sodium cyanide so as to give the corresponding nitrile, $R(OCH_2CH_2)_nCN$, which can be converted into the corresponding acid, of the following composition $R(OCH_2CH_2)_nCOOH$. Such acids can also be used to produce acyl derivatives of the kind previously described in which acetic acid is used as an acylating agent.

What has been said above is intended to emphasize the fact that the nitrogen compounds herein employed can vary from those which are strongly hydrophobe in character and have a minimum hydrophobe property, to those which are essentially hydrophile in character and have only a very minimum hydrophobe property. Examples of decreased hydrophobe character are exemplified by 2-methylimidazoline, 2-propylimidazoline, and 2-butylimidazoline, of the following structures:

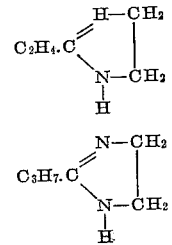

(17)

(18)

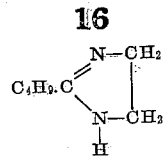

(19)

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. This procedure is noted in my copending application, S. N. 296,087 and further description of certain details is unnecessary.

Needless to say, as far as the ratio of reactants goes I have invariably employed approximately one mole of the resin based on the molecular weight of the resin molecule, 2 moles of the selected cyclic amidine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of nitrogen compound, and, again, have not found any particular advantage in so doing. Whenever feasible I have checked the completeness of reaction in the usual ways, including the amount of water reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously, little more need be said as to the actual procedure employed for the preparation of the herein described condensation products. The following example will serve by way of illustration:

Example 1b

The phenol-aldehyde resin is the one that has been identified previously as Example 2a. It was obtained from a paratertiary butyl phenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the two external nuclei, i. e., the resin was largely a mixture having 3 nuclei and 4 nuclei excluding the 2 external nuclei or 5 and 6 overall nuclei. The resin so obtained in a neutral state had a light amber color.

882 grams of the resin identified as 2a, preceding, were powdered and mixed with a somewhat lesser amount of xylene, i. e., 600 grams. The mixture was refluxed until solution was complete. It was then adjusted to approximately 35° C. and 612 grams of 2-oleylimidazoline, previously shown in a structural formula as ring compound (3), were added. The mixture was stirred vigorously and formaldehyde added slowly. In this particular case the formaldehyde used was a 37% solution and 162 grams were added in approximately 3 hours. The mixture was stirred vigorously and kept within a range of approximately 40° to 44° C., for about 16½ hours. At the end of this time it was refluxed, using a phase-separating trap and a small amount of aqueous distillate withdrawn from time to time. The presence of unreacted formaldehyde was noted. Any unreacted formaldehyde seemed to disappear in approximately three hours after refluxing started. As soon as the odor of formaldehyde was no longer detectible the phase-separating trap was set so as to eliminate all the water of solution and reaction. After the water was eliminated part of the xylene was removed until the temperature reached approximately 148° C. The mass was kept at this higher temperature for 3 or 4 hours. During this time any additional water of reaction which had formed, was probably eliminated by means of the trap. The residual xylene was permitted to stay in the cogeneric mixture. A small amount of the sample was heated on a water bath to remove the excess xylene. The residual material was dark red in color and had the consistency of a thick sticky fluid or tacky resin. The overall reaction time was approximately 30 hours. In other examples it varied from as little as 24 hours up to approximately 38 hours. The time can be reduced by cutting the low temperature period to approximately 3 to 6 hours. Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

having a capacity of approximately 25 gallons, and a working pressure of 300 pounds gauge pressure. The autoclave was equipped with the conventional devices and openings, such as the variable speed stirrer operating at speeds from 50 R. P. M. to 500 R. P. M., thermometer well and thermocouple for recorder controller; emptying outlet, pressure gauge, manual and rupture disc vent lines; charge hole for initial reactancts; at least one connection for conducting the incoming alkylene oxide, such as ethylene oxide, to the bottom of the autoclave; along with suitable devices for both cooling and heating the autoclave through the jacket. Also, I prefer coils in addition thereto, with the coils so arranged that they are suitable for heating with steam or cooling with water, and the jacket further equipped with electrical heating devices, such as are employed for hot oil or Dowtherm systems. Dowtherm, more specifically Dowtherm A, is a colorless non-corrosive liquid consisting of an eutectic mixture of diphenyl and diphenyl oxide. Such autoclaves are, of course, in essence, small scale replicas of the usual conventional autoclave used in commercial oxyalkylating procedure.

Continuous operation, or substantially continuous operation, is achieved by the use of a separate container to hold the alkylene oxide being employed, particularly ethylene oxide. The container consists essentially of a laboratory bomb having a capacity of about 10 to 15 gallons or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer, connection for nitrogen for pressuring bomb, etc. The bomb was placed on a scale during use and the connections between the bomb and the

TABLE II

| Ex. No. | Resin used | Amt., grs. | Amine used | Amt. of amine, grams | Strength of Formaldehyde soln. and amt. | Solvent used and amt. | Reaction temp., ° C. | Reaction time (hrs.) | Max. distill temp., ° C. |
|---|---|---|---|---|---|---|---|---|---|
| 1b | 2a | 882 | Amine 3 | 612 | 37%, 162 g | Xylene, 600 g | 30–25 | 30 | 148 |
| 2b | 5a | 480 | do | 306 | 37%, 81 g | Xylene, 450 g | 21–23 | 24 | 145 |
| 3b | 10a | 633 | do | 306 | do | Xylene, 600 g | 20–22 | 28 | 150 |
| 4b | 2a | 441 | Amine 4 | 281 | 30%, 100 g | Xylene, 400 g | 22–24 | 28 | 148 |
| 5b | 5a | 480 | do | 281 | do | Xylene, 450 g | 21–23 | 30 | 148 |
| 6b | 10a | 633 | do | 281 | 37%, 81 g | Xylene, 600 g | 21–25 | 26 | 146 |
| 7b | 2a | 441 | Amine 5 | 394 | do | Xylene, 400 g | 23–28 | 26 | 147 |
| 8b | 5a | 480 | do | 394 | do | Xylene, 450 g | 22–26 | 26 | 146 |
| 9b | 10a | 633 | do | 394 | do | Xylene, 600 g | 21–25 | 38 | 150 |
| 10b | 13a | 473 | Amine 13 | 379 | 30%, 100 g | Xylene, 450 g | 20–24 | 36 | 149 |
| 11b | 14a | 511 | do | 379 | do | Xylene, 500 g | 21–22 | 24 | 142 |
| 12b | 15a | 665 | do | 379 | do | Xylene, 650 g | 20–21 | 26 | 145 |
| 13b | 2a | 441 | Amine 16 | 395 | 38%, 81 g | Xylene, 425 g | 22–28 | 28 | 146 |
| 14b | 5a | 480 | do | 395 | 37%, 81 g | Xylene, 450 g | 23–30 | 27 | 150 |
| 15b | 9a | 595 | do | 395 | do | Xylene, 550 g | 20–24 | 29 | 147 |
| 16b | 2a | 441 | Amine 17 | 99 | do | Xylene, 440 g | 20–21 | 30 | 148 |
| 17b | 5a | 480 | do | 99 | do | Xylene, 480 g | 21–26 | 32 | 146 |
| 18b | 14a | 511 | do | 99 | do | Xylene, 600 g | 21–23 | 26 | 147 |
| 19b | 22a | 498 | Amine 18 | 113 | do | Xylene, 500 g | 21–32 | 29 | 150 |
| 20b | 23a | 542 | do | 113 | do | do | 21–30 | 32 | 150 |
| 21b | 25a | 547 | do | 113 | do | Xylene, 550 g | 21–23 | 37 | 150 |
| 22b | 2a | 441 | Amine 19 | 126 | do | Xylene, 440 g | 20–22 | 30 | 150 |
| 23b | 26a | 595 | do | 126 | do | Xylene, 600 g | 20–25 | 36 | 149 |
| 24b | 27a | 391 | do | 126 | 30%, 50 g | Xylene, 400 g | 20–24 | 32 | 152 |

NOTE.—The amine numbers referred to are the ring compounds identified previously by number in part 2.

PART 4

In preparing oxyalkylated derivatives of products of the kind which appear as examples in Part 3, I have found it particularly advantageous to use laboratory equipment which permits continuous oxypropylation and oxyethylation. More specific reference will be made to treatment with glycide subsequently in the text. The oxyethylation step is, of course, the same as the oxypropylation step insofar that two low boiling liquids are handled in each instance. What immediately follows refers to oxyethylation and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional jacketed autoclave, made of stainless steel and autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxyethylations became uniform in that the reaction temperature could be held within a few degrees of any selected point in this particular range. In the early stages where the concentration of catalyst is high the temperature was generally set for around 130° C., or thereabouts. Subsequently the temperature may be somewhat higher for instance, 135° C. to 140° C. Under other conditoins, definitely higher temperatures may be employed, for instance 170° C. to 175° C. It will be noted by examination of subsequent examples that this temperature range was satisfactory. In any case, where the reaction goes more slowly a higher temperature may be used, for instance, 140° C. to 145° C., and if need be 150° C. to 160° C. Incidentally, oxypropylation takes place more slowly than oxyethylation as a rule and for this reason I have used a temperature of approximately 135° C. to 140° C., as being particularly desirable for initial oxypropylation, and have stayed within the range of 130° C. to 135° C. almost invariably during oxypropylation. The lesser reactivity of propylene oxide compared with ethylene oxide can be offset by use of more catalyst, more vigorous agitation and perhaps a longer time period. The ethylene oxide was forced in by means of nitrogen pressure as rapidly as it was absorbed as indicated by the pressure gauge on the autoclave. In case the reaction slowed up the temperature was raised so as to speed up the reaction somewhat by use of extreme heat. If need be, cooling water was employed to control the temperature.

As previously pointed out in the case of oxypropylation as differentiated from oxyethylation, there was a tendency for the reaction to slow up as the temperature dropped much below the selected point of reaction, for instance, 135° C. In this instance, the technique employed was the same as before, that is, either cooling water was cut down or steam was employed, or the addition of propylene oxide speeded up, or electric heat used in addition to the steam in order that the reaction proceeded at, or near, the selected temperatures to be maintained.

Inversely, if the reaction proceeded too fast regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are depending on the required number of conventional gauges, check valves, etc., and the entire equipment, as has been pointed out, is conventional and, as far as I am aware can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precautions should be taken that glycide cannot polymerize per se; (e) due to the high boiling point of glycide one can readily employ a typical separatable glass resin pot as described in U. S. Patent No. 2,499,370 dated March 7, 1950, and offered for sale by numerous laboratory supply houses. If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluids or reactants to mix due to swirling action in the center of the pot. Still better, is the use of a laboratory autoclave of the kind previously described in this part of the text, but in any event, when the initial amount of glycide is added to a suitable reactant, such as the herein described amine-modified phenol-aldehyde resin, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

Although ethylene oxide and propylene oxide may represent less of a hazard than glycide, yet these reactants should be handled with extreme care. One suitable procedure involves the use of propylene oxide or butylene oxide as a solvent as well as a reactant in the earlier stages along with ethylene oxide, for instance, by dissolving the appropriate resin condensate in propylene oxide even though oxyalkylation is taking place to a greater or lesser degree. After a solution has been obtained which represents the selected resin condensate dissolved in propylene oxide or butylene oxide, or a mixture which includes the oxyalkylated product, ethylene oxide is added to react with the liquid mass until hydrophile properties are obtained, if not previously present to the desired degree. Indeed hydrophile character can be reduced or balanced by use of some other oxide such as propylene oxide or butylene oxide. Since ethylene oxide is more reactive than propylene oxide or butylene oxide, the final product may contain some unreacted propylene oxide or butylene oxide which can be eliminated by volatilization or distillation in any suitable manner. See article entitled "Ethylene oxide hazards and methods of handling," Industrial and Engineering Chemistry, volume 42, No. 6, June 1950, pp. 1251–1258. Other procedures can be employed as, for example, that described in U. S. Patent No. 2,586,767, dated February 19, 1952, to Wilson.

*Example 1c*

The oxyalkylation-susceptible compound employed is the one previously described and designated as Example 1b. Condensate 1b was in turn obtained from 2-oleylimidazoline and the resin previously identified as Example 2a. Reference to Table I shows that this particular resin is obtained from paratertiarybutylphenol and formaldehyde. 15.18 pounds of this resin condensate were dissolved in 6 pounds of solvent (xylene) along with 1.0 pound of finely powdered caustic soda as a catalyst. Adjustment was made in the auto-clave to operate at a temperature of approximately 125° C. to 135° C., and at a pressure of about 20 to 25 pounds. In some subsequent examples pressures up to 35 pounds were employed.

The time regulator was set so as to inject the ethylene oxide in approximately three-quarters of an hour and then continue stirring for 15 minutes or longer, a total time of one hour. The reaction went readily, and, as a matter of fact, the oxide was taken up almost immediately. The speed of reaction, particularly at the low pressure, undoubtedly was due in a large measure to excellent agitation and also to the comparatively high concentration of catalyst. The amount of ethylene oxide introduced was equal in weight to the initial condensation product, to wit, 15.18 pounds. This represented a molal ratio of 34.5 moles of ethylene oxide per mole of condensate.

The theoretical molecular weight at the end of the reaction period was 3036. A comparatively small sample, less than 50 grams, was withdrawn merely for examination as far as solubility or emulsifying power was concerned and also for the purpose of making some tests on various oil field emulsions. The amount withdrawn was so small that no cognizance of this fact is included in the data, or subsequent data, or in the data presented in tabular form in subsequent Tables 3 and 4.

The size of the autoclave employed was 25 gallons. In innumerable comparable oxyalkylations I have withdrawn a substantial portion at the end of each step and continued oxyalkylation on a partial residual sample. This was not the case in this particular series. Certain examples were duplicated as hereinafter noted and subjected to oxyalkylation with a different oxide.

*Example 2c*

This example simply illustrates the further oxyalkylation of Example 1c, preceding. As previously stated, the oxyalkylation-susceptible compound, to wit, Example 1b, present at the beginning of the stage was obviously the same as at the end of the prior stage (Example 1c), to wit, 15.18 pounds. The amount of oxide present in the initial step was 15.18 pounds, the amount of catalyst remained the same, to wit, 1.0 pound, and the amount of solvent remained the same. The amount of oxide added was another 15.18 pounds, all addition of oxide in these various stages being based on the addition of this particular amount. Thus, at the end of the oxyethylation step the amount of oxide added was a total of 30.36 pounds and the molal ratio of ethylene oxide to resin condensate was 69.0 to 1.0. The theoretical molecular weight was 3348.

The maximum temperature during the operation was 125° C. to 130° C. The maximum pressure was in the range of 20 to 25 pounds. The time period was one and one-half hours.

*Example 3c*

The oxyalkylation proceeded in the same manner described in Examples 1c and 2c. There was no added solvent and no added catalyst. The oxide added was 15.18 pounds and the total oxide at the end of the oxyethylation step was 45.54 pounds. The molal ratio of oxide to condensate was 103.5 to 1. Conditions as far as temperature and pressure and time were concerned were all the same as in Example 1c and 2c. The time period was somewhat longer than in previous examples, to wit, 3 hours.

*Example 4c*

The oxyethylation was continued and the amount of oxide added again was 15.18 pounds. There was no added catalyst and no added solvent. The theoretical molecular weight at the end of the reaction period was 6072. The molal ratio of oxide to condensate was 138.0 to 1. Conditions as far as temperature and pressure were concerned were the same as in previous examples. The time period was slightly longer, to wit, 3½ hours. The reaction unquestionably began to slow up somewhat.

*Example 5c*

The oxyethylation continued with the introduction of another 15.18 pounds of ethylene oxide. No more solvent was introduced but .3 pound caustic soda was added. The theoretical molecular weight at the end of the agitation period was 9108, and the molal ratio of oxide to resin condensate was 172.5 to 1. The time period, however, dropped to 3 hours. Operating temperature and pressure remained the same as in the previous example.

*Example 6c*

The same procedure was followed as in the previous examples. The amount of oxide added was another 15.18 pounds, bringing the total oxide introduced to 91.08 pounds. The temperature and pressure during this period were the same as before. There was no added solvent. The time period was 3½ hours. Molal ratio of oxide to resin condensate was 207.0 to one.

*Example 7c*

The same procedure was followed as in the previous six examples without the addition of more caustic or more solvent. The total amount of oxide introduced at the end of the period was 106.26 pounds. The theoretical molecular weight at the end of the oxyalkylation period was 12,144. The time required for the oxyethylation was a bit longer than in the previous step, to wit, 4 hours.

*Example 8c*

This was the final oxyethylation in this particular series. There was no added solvent and no added catalyst. The total amount of oxide added at the end of this step was 121.44 pounds. The theoretical molecular weight was 13,662. The molal ratio of oxide to resin condensate was 276.0 to one. Conditions as far as temperature and pressure were concerned were the same as in the previous examples and the time required for oxyethylation was 4 hours.

The same procedure as described in the previous examples was employed in connection with a number of the other condensates described previously. All these data have been presented in tabular form in a series of four tables, Tables III and IV, V and VI.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables III and IV, it will be noted that compounds 1c through 40c were obtained by the use of ethylene oxide, whereas 41c through 80c were obtained by the use of propylene oxide alone.

Thus, in reference to Table III it is to be noted as follows:

The example number of each compound is indicated in the first column.

The identity of the oxyalkylation-susceptible compound, to wit, the resin condensate, is indicated in the second column.

The amount of condensate is shown in the third column.

Assuming that ethylene oxide alone is employed, as happens to be the case in Examples 1c through 40c, the amount of oxide present in the oxyalkylation derivative is shown in Column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent employed.

The 8th column can be ignored where a single oxide was employed.

The 9th column shows the theoretical molecular weight at the end of the oxyalkylation period.

The 10th column states the amount of condensate present in the reaction mass at the end of the period.

As pointed out previously, in this particular series the amount of reaction mass withdrawn for examination was so small that it was ignored and for this reason the resin condensate in Column 10 coincides with the figure in Column 3.

Column 11 shows the amount of ethylene oxide employed in the reaction mass at the end of the particular period.

Column 12 can be ignored insofar that no propylene oxide was employed.

Column 13 shows the catalyst at the end of the reaction period.

Column 14 shows the amount of solvent at the end of the reaction period.

Column 15 shows the molal ratio of ethylene oxide to condensate.

Column 16 can be ignored for the reason that no propylene oxide was employed.

Referring now to Table VI. It is to be noted that the first column refers to Examples 1c, 2c, 3c, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

Referring to Table IV, Examples 41c through 80c, are the counterparts of Examples 1c through 40c, except that the oxide employed is propylene oxide instead of ethylene oxide. Therefore, as explained previously, four columns are blank, to wit, Columns 4, 8, 11 and 15.

Reference is now made to Table V. It is to be noted these compounds are designated by "d" numbers, 1d, 2d, 3d, etc., through and including 32d. They are derived, in turn, from compounds in the "c" series, for example, 36c, 40c, 54c, and 76c. These compounds involve the use of both ethylene oxide and propylene oxide. Since compounds 1c through 40c were obtained by the use of ethylene oxide, it is obvious that those obtained from 36c and 40c, involve the use of ethylene oxide first, and propylene oxide afterward. Inversely, those compounds obtained from 54c and 76c obviously come from a prior series in which propylene oxide was used first.

In the preparation of this series indicated by the small letter "d," as 1d, 2d, 3d, etc., the initial "c" series such as 36c, 40c, 54c, and 76c, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in 1d through 16d, and ethylene oxide in 17d through 32d, inclusive.

In examining the table beginning with 1d, it will be noted that the initial product, i. e., 36c, consisted of the reaction product involving 15.18 pounds of the resin condensate, 22.27 pounds of ethylene oxide, 1.0 pound of caustic soda, and 6.0 pounds of the solvent.

It is to be noted that reference to the catalyst in Table V refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

In this series, it will be noted that the theoretical molecular weights are given prior to the oxyalkylation step and after the oxyalkylation step, although the value at the end of one step is the value at the beginning of the next step, except obviously at the very start the value depends on the theoretical molecular weight at the end of the initial oxyalkylation step; i. e., oxyethylation for 1d through 16d, and oxypropylation for 17d through 32d.

It will be noted also that under the molal ratio the values of both oxides to the resin condensate are included.

The data given in regard to the operating conditions is substantially the same as before and appears in Table VI.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The colors of the products usually vary from a reddish amber tint to a definitely red, and amber. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily in the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE III

| Ex. No. | Composition before | | | | | | | Composition at end | | | | | | Molal ratio to resin condensate | |
|---|---|---|---|---|---|---|---|---|---|---|---|---|---|---|---|
| | O-S cmpd., Ex. No. | O-S* cmpd., lbs. | Ethl. oxide, lbs. | Propl. oxide, lbs. | Catalyst, lbs. | Solvent, lbs. | Theo. mol. wt. | Theo. mol. wt. | O-S* cmpd., lbs. | Ethl. oxide, lbs. | Propl. oxide, lbs. | Catalyst, lbs. | Solvent, lbs. | Ethyl. oxide | Propl. oxide |
| 1c | 1b | 15.18 | -------- | -------- | 1.5 | 6.0 | -------- | 3,036 | 15.18 | 15.18 | -------- | 1.5 | 6.0 | 34.5 | -------- |
| 2c | 1b | 15.18 | 15.18 | -------- | 1.5 | 6.0 | -------- | 4,554 | 15.18 | 30.36 | -------- | 1.5 | 6.0 | 69.0 | -------- |
| 3c | 1b | 15.18 | 30.36 | -------- | 1.5 | 6.0 | -------- | 6,072 | 15.18 | 45.54 | -------- | 1.5 | 6.0 | 103.5 | -------- |
| 4c | 1b | 15.18 | 45.54 | -------- | 1.5 | 6.0 | -------- | 7,590 | 15.18 | 60.72 | -------- | 1.5 | 6.0 | 138.0 | -------- |
| 5c | 1b | 15.18 | 60.72 | -------- | 1.3 | 6.0 | -------- | 9,108 | 15.18 | 75.90 | -------- | 1.3 | 6.0 | 172.5 | -------- |
| 6c | 1b | 15.18 | 75.90 | -------- | 1.3 | 6.0 | -------- | 10,626 | 15.18 | 91.08 | -------- | 1.3 | 6.0 | 207.0 | -------- |
| 7c | 1b | 15.18 | 91.08 | -------- | 1.3 | 6.0 | -------- | 12,144 | 15.18 | 106.26 | -------- | 1.3 | 6.0 | 241.5 | -------- |
| 8c | 1b | 15.18 | 106.26 | -------- | 1.3 | 6.0 | -------- | 13,662 | 15.18 | 121.44 | -------- | 1.3 | 6.0 | 276.0 | -------- |
| 9c | 5b | 15.46 | -------- | -------- | 1.5 | 4.5 | -------- | 3,092 | 15.46 | 15.46 | -------- | 1.5 | 4.5 | 35.2 | -------- |
| 10c | 5b | 15.46 | 15.46 | -------- | 1.5 | 4.5 | -------- | 4,638 | 15.46 | 30.92 | -------- | 1.5 | 4.5 | 70.4 | -------- |
| 11c | 5b | 15.46 | 30.92 | -------- | 1.5 | 4.5 | -------- | 6,184 | 15.46 | 46.38 | -------- | 1.5 | 4.5 | 105.6 | -------- |
| 12c | 5b | 15.46 | 46.38 | -------- | 1.3 | 4.5 | -------- | 7,730 | 15.46 | 61.84 | -------- | 1.5 | 4.5 | 140.8 | -------- |
| 13c | 5b | 15.46 | 61.84 | -------- | 1.3 | 4.5 | -------- | 9,276 | 15.46 | 77.30 | -------- | 1.5 | 4.5 | 176.0 | -------- |
| 14c | 5b | 15.46 | 77.30 | -------- | 1.3 | 4.5 | -------- | 10,822 | 15.46 | 92.76 | -------- | 1.5 | 4.5 | 211.2 | -------- |
| 15c | 5b | 15.46 | 92.76 | -------- | 1.3 | 4.5 | -------- | 12,368 | 15.46 | 108.22 | -------- | 1.5 | 4.5 | 246.4 | -------- |
| 16c | 5b | 15.46 | 108.22 | -------- | 1.3 | 4.5 | -------- | 13,914 | 15.46 | 123.68 | -------- | 1.5 | 4.5 | 281.6 | -------- |
| 17c | 14b | 17.74 | -------- | -------- | 1.0 | 4.5 | -------- | 3,548 | 17.74 | 17.74 | -------- | 1.0 | 4.5 | 40.4 | -------- |
| 18c | 14b | 17.74 | 17.74 | -------- | 1.0 | 4.5 | -------- | 5,392 | 17.74 | 35.48 | -------- | 1.0 | 4.5 | 80.8 | -------- |
| 19c | 14b | 17.74 | 35.48 | -------- | 1.0 | 4.5 | -------- | 7,096 | 17.74 | 53.22 | -------- | 1.0 | 4.5 | 121.2 | -------- |
| 20c | 14b | 17.74 | 53.22 | -------- | 1.0 | 4.5 | -------- | 8,870 | 17.74 | 70.96 | -------- | 1.0 | 4.5 | 161.6 | -------- |
| 21c | 14b | 17.74 | 70.96 | -------- | 1.5 | 4.5 | -------- | 10,644 | 17.74 | 88.70 | -------- | 1.0 | 4.5 | 202.0 | -------- |
| 22c | 14b | 17.74 | 88.70 | -------- | 1.5 | 4.5 | -------- | 12,418 | 17.74 | 106.44 | -------- | 1.0 | 4.5 | 242.4 | -------- |
| 23c | 14b | 17.74 | 106.44 | -------- | 1.5 | 4.5 | -------- | 14,192 | 17.74 | 124.18 | -------- | 1.0 | 4.5 | 282.8 | -------- |
| 24c | 14b | 17.74 | 124.18 | -------- | 1.5 | 4.5 | -------- | 15,966 | 17.74 | 141.92 | -------- | 1.0 | 4.5 | 363.6 | -------- |
| 25c | 22b | 11.58 | -------- | -------- | 1.0 | 4.4 | -------- | 2,316 | 11.58 | 11.58 | -------- | 1.0 | 4.4 | 26.3 | -------- |
| 26c | 22b | 11.58 | 11.58 | -------- | 1.0 | 4.4 | -------- | 3,474 | 11.58 | 23.16 | -------- | 1.0 | 4.4 | 52.6 | -------- |
| 27c | 22b | 11.58 | 23.16 | -------- | 1.0 | 4.4 | -------- | 4,632 | 11.58 | 34.74 | -------- | 1.0 | 4.4 | 78.9 | -------- |
| 28c | 22b | 11.58 | 34.74 | -------- | 1.0 | 4.4 | -------- | 5,790 | 11.58 | 46.32 | -------- | 1.0 | 4.4 | 105.2 | -------- |
| 29c | 22b | 11.58 | 46.32 | -------- | 1.5 | 4.4 | -------- | 6,948 | 11.58 | 57.90 | -------- | 1.5 | 4.4 | 131.5 | -------- |
| 30c | 22b | 11.58 | 57.90 | -------- | 1.5 | 4.4 | -------- | 8,106 | 11.58 | 69.48 | -------- | 1.5 | 4.4 | 157.8 | -------- |
| 31c | 22b | 11.58 | 69.48 | -------- | 1.5 | 4.4 | -------- | 9,264 | 11.58 | 81.06 | -------- | 1.5 | 4.4 | 184.1 | -------- |
| 32c | 22b | 11.58 | 81.06 | -------- | 1.5 | 4.4 | -------- | 10,422 | 11.58 | 92.64 | -------- | 1.5 | 4.4 | 210.4 | -------- |
| 33c | 1b | 15.18 | -------- | -------- | 1.0 | 6.0 | -------- | 2,277 | 15.18 | 7.59 | -------- | 1.0 | 6.0 | 17.2 | -------- |
| 34c | 1b | 15.18 | 7.59 | -------- | 1.0 | 6.0 | -------- | 3,036 | 15.18 | 15.18 | -------- | 1.0 | 6.0 | 34.4 | -------- |
| 35c | 1b | 15.18 | 15.18 | -------- | 1.0 | 6.0 | -------- | 3,795 | 15.18 | 22.77 | -------- | 1.0 | 6.0 | 51.6 | -------- |
| 36c | 1b | 15.18 | 22.77 | -------- | 1.0 | 6.0 | -------- | 4,554 | 15.18 | 30.36 | -------- | 1.0 | 6.0 | 68.8 | -------- |
| 37c | 1b | 15.18 | 30.36 | -------- | 1.3 | 6.0 | -------- | 5,313 | 15.18 | 37.95 | -------- | 1.3 | 6.0 | 86.0 | -------- |
| 38c | 1b | 15.18 | 37.95 | -------- | 1.3 | 6.0 | -------- | 6,072 | 15.18 | 45.54 | -------- | 1.3 | 6.0 | 103.2 | -------- |
| 39c | 1b | 15.18 | 45.54 | -------- | 1.3 | 6.0 | -------- | 6,831 | 15.18 | 53.13 | -------- | 1.3 | 6.0 | 120.4 | -------- |
| 40c | 1b | 15.18 | 53.13 | -------- | 1.3 | 6.0 | -------- | 7,590 | 15.18 | 60.72 | -------- | 1.3 | 6.0 | 137.6 | -------- |

*Oxyalkylation-susceptible.

TABLE IV

| Ex. No. | O-S cmpd., Ex. No. | Composition before | | | | | | Composition at end | | | | | | Molal ratio to resin condensate | |
|---|---|---|---|---|---|---|---|---|---|---|---|---|---|---|---|
| | | O-S* cmpd., lbs. | Ethl. oxide, lbs. | Propl. oxide, lbs. | Catalyst, lbs. | Solvent, lbs. | Theo. mol. wt. | Theo. mol. wt. | O-S* cmpd., lbs. | Ethl. oxide, lbs. | Propl. oxide, lbs. | Catalyst, lbs. | Solvent, lbs. | Ethyl. oxide | Propl. oxide |
| 41c | 1b | 15.18 | | 15.18 | 1.1 | 6.0 | | 3,036 | 15.18 | | 15.18 | 1.1 | 6.0 | | 26.2 |
| 42c | 1b | 15.18 | | 30.36 | 1.1 | 6.0 | | 4,554 | 15.18 | | 30.36 | 1.1 | 6.0 | | 52.4 |
| 43c | 1b | 15.18 | | 45.54 | 1.1 | 6.0 | | 6,072 | 15.18 | | 45.54 | 1.1 | 6.0 | | 78.6 |
| 44c | 1b | 15.18 | | 60.72 | 1.1 | 6.0 | | 7,590 | 15.18 | | 60.72 | 1.1 | 6.0 | | 104.8 |
| 45c | 1b | 15.18 | | 75.90 | 1.1 | 6.0 | | 10,626 | 15.18 | | 75.90 | 1.1 | 6.0 | | 131.0 |
| 46c | 1b | 15.18 | | 106.26 | 1.5 | 6.0 | | 13,662 | 15.18 | | 106.26 | 1.5 | 6.0 | | 183.4 |
| 47c | 1b | 15.18 | | 136.62 | 1.5 | 6.0 | | 16,698 | 15.18 | | 136.62 | 1.5 | 6.0 | | 235.8 |
| 48c | 1b | 15.18 | | 166.98 | 1.5 | 6.0 | | 18,216 | 15.18 | | 166.98 | 1.5 | 6.0 | | 288.2 |
| 49c | 5b | 15.46 | | 15.46 | 1.1 | 4.5 | | 3,092 | 15.46 | | 15.46 | 1.1 | 4.5 | | 26.6 |
| 50c | 5b | 15.46 | | 30.92 | 1.1 | 4.5 | | 4,638 | 15.46 | | 30.92 | 1.1 | 4.5 | | 53.2 |
| 51c | 5b | 15.46 | | 46.38 | 1.1 | 4.5 | | 6,184 | 15.46 | | 46.38 | 1.1 | 4.5 | | 79.8 |
| 52c | 5b | 15.46 | | 61.84 | 1.1 | 4.5 | | 7,730 | 15.46 | | 61.84 | 1.1 | 4.5 | | 106.4 |
| 53c | 5b | 15.46 | | 77.30 | 1.1 | 4.5 | | 10,822 | 15.46 | | 77.30 | 1.1 | 4.5 | | 133.0 |
| 54c | 5b | 15.46 | | 108.22 | 1.5 | 4.5 | | 13,914 | 15.46 | | 108.22 | 1.5 | 4.5 | | 186.2 |
| 55c | 5b | 15.46 | | 139.14 | 1.5 | 4.5 | | 17,006 | 15.46 | | 139.14 | 1.5 | 4.5 | | 238.4 |
| 56c | 5b | 15.46 | | 170.06 | 1.5 | 4.5 | | 18,552 | 15.46 | | 170.06 | 1.5 | 4.5 | | 292.6 |
| 57c | 14b | 17.74 | | 17.74 | 1.2 | 4.5 | | 3,548 | 17.74 | | 17.74 | 1.2 | 4.5 | | 30.6 |
| 58c | 14b | 17.74 | | 35.48 | 1.2 | 4.5 | | 5,322 | 17.74 | | 35.48 | 1.2 | 4.5 | | 61.2 |
| 59c | 14b | 17.74 | | 53.22 | 1.2 | 4.5 | | 7,096 | 17.74 | | 53.22 | 1.2 | 4.5 | | 91.8 |
| 60c | 14b | 17.74 | | 70.96 | 1.2 | 4.5 | | 8,870 | 17.74 | | 70.96 | 1.2 | 4.5 | | 122.4 |
| 61c | 14b | 17.74 | | 88.70 | 1.2 | 4.5 | | 12,418 | 17.74 | | 88.70 | 1.2 | 4.5 | | 153.0 |
| 62c | 14b | 17.74 | | 124.18 | 1.7 | 4.5 | | 15,966 | 17.74 | | 124.18 | 1.7 | 4.5 | | 214.2 |
| 63c | 14b | 17.74 | | 159.66 | 1.7 | 4.5 | | 19,514 | 17.74 | | 159.66 | 1.7 | 4.5 | | 275.4 |
| 64c | 14b | 17.74 | | 195.14 | 1.7 | 4.5 | | 21,288 | 17.74 | | 195.14 | 1.7 | 4.5 | | 336.6 |
| 65c | 22b | 11.58 | | 11.58 | 1.0 | 4.4 | | 2,316 | 11.58 | | 11.58 | 1.0 | 4.4 | | 19.95 |
| 66c | 22b | 11.58 | | 23.16 | 1.0 | 4.4 | | 3,474 | 11.58 | | 23.16 | 1.0 | 4.4 | | 39.90 |
| 67c | 22b | 11.58 | | 34.74 | 1.0 | 4.4 | | 4,632 | 11.58 | | 34.74 | 1.0 | 4.4 | | 59.80 |
| 68c | 22b | 11.58 | | 46.32 | 1.0 | 4.4 | | 5,790 | 11.58 | | 46.32 | 1.0 | 4.4 | | 79.80 |
| 69c | 22b | 11.58 | | 57.90 | 1.5 | 4.4 | | 8,106 | 11.58 | | 57.90 | 1.5 | 4.4 | | 99.60 |
| 70c | 22b | 11.58 | | 81.06 | 1.5 | 4.4 | | 10,422 | 11.58 | | 81.06 | 1.5 | 4.4 | | 140.0 |
| 71c | 22b | 11.58 | | 104.22 | 1.5 | 4.4 | | 12,738 | 11.58 | | 104.22 | 1.5 | 4.4 | | 180.0 |
| 72c | 22b | 11.58 | | 127.38 | 1.5 | 4.4 | | 13,896 | 11.58 | | 127.38 | 1.5 | 4.4 | | 219.9 |
| 73c | 1b | 15.18 | | | 1.0 | 6.0 | | 2,279 | 15.18 | | | 1.0 | 6.0 | | 13.15 |
| 74c | 1b | 15.18 | | 7.59 | 1.0 | 6.0 | | 3,036 | 15.18 | | 7.59 | 1.0 | 6.0 | | 26.3 |
| 75c | 1b | 15.18 | | 15.18 | 1.0 | 6.0 | | 3,795 | 15.18 | | 15.18 | 1.0 | 6.0 | | 39.45 |
| 76c | 1b | 15.18 | | 22.77 | 1.0 | 6.0 | | 4,554 | 15.18 | | 22.77 | 1.0 | 6.0 | | 52.60 |
| 77c | 1b | 15.18 | | 30.36 | 1.0 | 6.0 | | 5,313 | 15.18 | | 30.36 | 1.0 | 6.0 | | 65.75 |
| 78c | 1b | 15.18 | | 37.95 | 1.4 | 6.0 | | 6,831 | 15.18 | | 37.95 | 1.4 | 6.0 | | 92.05 |
| 79c | 1b | 15.18 | | 53.13 | 1.4 | 6.0 | | 8,349 | 15.18 | | 53.13 | 1.4 | 6.0 | | 118.35 |
| 80c | 1b | 15.18 | | 68.31 | 1.4 | 6.0 | | 9,867 | 15.18 | | 68.31 | 1.4 | 6.0 | | 144.65 |

*Oxyalkylation-susceptible.

TABLE V

| Ex. No. | O-S cmpd., Ex. No. | Composition before | | | | | | Composition at end | | | | | | Molal ratio to resin condensate | |
|---|---|---|---|---|---|---|---|---|---|---|---|---|---|---|---|
| | | O-S* cmpd., lbs. | Ethl. oxide, lbs. | Propl. oxide, lbs. | Catalyst, lbs. | Solvent, lbs. | Theo. mol. wt. | Theo. mol. wt. | O-S* cmpd., lbs. | Ethl. oxide, lbs. | Propl. oxide, lbs. | Catalyst, lbs. | Solvent, lbs. | Ethyl. oxide | Propl. oxide |
| 1d | 36c | 15.18 | 30.36 | | 1.0 | 6.0 | 4,554 | 5,313 | 15.18 | 30.36 | 7.59 | 1.0 | 6.0 | 68.8 | 13.10 |
| 2d | 36c | 15.18 | 30.36 | 7.59 | 1.0 | 6.0 | 5,313 | 6,072 | 15.18 | 30.36 | 15.18 | 1.0 | 6.0 | 68.8 | 26.15 |
| 3d | 36c | 15.18 | 30.36 | 15.18 | 1.0 | 6.0 | 6,072 | 6,831 | 15.18 | 30.36 | 22.77 | 1.0 | 6.0 | 68.8 | 39.20 |
| 4d | 36c | 15.18 | 30.36 | 22.77 | 1.0 | 6.0 | 6,831 | 7,590 | 15.18 | 30.36 | 30.36 | 1.0 | 6.0 | 68.8 | 52.3 |
| 5d | 36c | 15.18 | 30.36 | 30.36 | 1.0 | 6.0 | 7,590 | 8,349 | 15.18 | 30.36 | 37.95 | 1.0 | 6.0 | 68.8 | 60.5 |
| 6d | 36c | 15.18 | 30.36 | 37.95 | 1.0 | 6.0 | 8,349 | 9,108 | 15.18 | 30.36 | 45.54 | 1.5 | 6.0 | 68.8 | 78.6 |
| 7d | 36c | 15.18 | 30.36 | 45.54 | 1.5 | 6.0 | 9,108 | 10,626 | 15.18 | 30.36 | 60.72 | 1.5 | 6.0 | 68.8 | 104.8 |
| 8d | 36c | 15.18 | 30.36 | 60.72 | 1.5 | 6.0 | 10,626 | 12,144 | 15.18 | 30.36 | 75.90 | 1.5 | 6.0 | 68.8 | 131.8 |
| 9d | 40c | 15.18 | 60.72 | | 1.3 | 6.0 | 7,590 | 8,349 | 15.18 | 60.72 | 7.59 | 1.3 | 6.0 | 137.6 | 13.1 |
| 10d | 40c | 15.18 | 60.72 | 7.59 | 1.3 | 6.0 | 8,349 | 9,108 | 15.18 | 60.72 | 15.18 | 1.3 | 6.0 | 137.6 | 26.2 |
| 11d | 40c | 15.18 | 60.72 | 15.18 | 1.3 | 6.0 | 9,108 | 10,626 | 15.18 | 60.72 | 30.36 | 1.3 | 6.0 | 137.6 | 52.4 |
| 12d | 40c | 15.18 | 60.72 | 30.36 | 1.3 | 6.0 | 10,626 | 12,144 | 15.18 | 60.72 | 45.54 | 1.3 | 6.0 | 137.6 | 78.6 |
| 13d | 40c | 15.18 | 60.72 | 45.54 | 1.3 | 6.0 | 12,144 | 13,662 | 15.18 | 60.72 | 60.72 | 1.8 | 6.0 | 137.6 | 104.8 |
| 14d | 40c | 15.18 | 60.72 | 60.72 | 1.8 | 6.0 | 13,662 | 14,421 | 15.18 | 60.72 | 68.21 | 1.8 | 6.0 | 137.6 | 117.9 |
| 15d | 40c | 15.18 | 60.72 | 68.21 | 1.8 | 6.0 | 14,421 | 15,180 | 15.18 | 60.72 | 75.90 | 1.8 | 6.0 | 137.6 | 131.0 |
| 16d | 40c | 15.18 | 60.72 | 75.90 | 1.8 | 6.0 | 15,180 | 16,698 | 15.18 | 60.72 | 91.08 | 1.8 | 6.0 | 137.6 | 157.2 |
| 17d | 54c | 15.46 | | 108.22 | 1.5 | 4.5 | 13,914 | 14,300 | 15.46 | 3.86 | 108.22 | 1.5 | 4.5 | 8.75 | 186.2 |
| 18d | 54c | 15.46 | 3.86 | 108.22 | 1.5 | 4.5 | 14,300 | 14,687 | 15.46 | 7.73 | 108.22 | 1.5 | 4.5 | 17.6 | 186.2 |
| 19d | 54c | 15.46 | 7.73 | 108.22 | 1.5 | 4.5 | 14,687 | 15,460 | 15.46 | 15.46 | 108.22 | 1.5 | 4.5 | 35.2 | 186.2 |
| 20d | 54c | 15.46 | 15.46 | 108.22 | 1.5 | 4.5 | 15,460 | 16,333 | 15.46 | 23.19 | 108.22 | 1.5 | 4.5 | 52.8 | 186.2 |
| 21d | 54c | 15.46 | 23.19 | 108.22 | 1.5 | 4.5 | 16,333 | 17,106 | 15.46 | 30.92 | 108.22 | 1.5 | 4.5 | 70.3 | 186.2 |
| 22d | 54c | 15.46 | 30.92 | 108.22 | 1.5 | 4.5 | 17,106 | 17,879 | 15.46 | 38.65 | 108.22 | 1.5 | 4.5 | 87.9 | 186.2 |
| 23d | 54c | 15.46 | 38.63 | 108.22 | 1.5 | 4.5 | 17,879 | 18,652 | 15.46 | 46.38 | 108.22 | 1.5 | 4.5 | 105.2 | 186.2 |
| 24d | 54c | 15.46 | 46.38 | 108.22 | 1.5 | 4.5 | 18,652 | 19,425 | 15.46 | 54.11 | 108.22 | 1.5 | 4.5 | 123.0 | 186.2 |
| 25d | 76c | 15.18 | | 30.36 | 1.0 | 6.0 | 4,554 | 5,313 | 15.18 | 7.59 | 30.36 | 1.0 | 6.0 | 17.25 | 52.6 |
| 26d | 76c | 15.18 | 7.59 | 30.36 | 1.0 | 6.0 | 5,313 | 6,072 | 15.18 | 15.18 | 30.36 | 1.0 | 6.0 | 34.50 | 52.6 |
| 27d | 76c | 15.18 | 15.18 | 30.36 | 1.0 | 6.0 | 6,072 | 6,831 | 15.18 | 22.77 | 30.36 | 1.0 | 6.0 | 51.75 | 52.6 |
| 28d | 76c | 15.18 | 22.77 | 30.36 | 1.0 | 6.0 | 6,831 | 7,590 | 15.18 | 30.36 | 30.36 | 1.0 | 6.0 | 69.0 | 52.6 |
| 29d | 76c | 15.18 | 30.36 | 30.36 | 1.0 | 6.0 | 7,590 | 9,108 | 15.18 | 45.54 | 30.36 | 1.5 | 6.0 | 103.0 | 52.6 |
| 30d | 76c | 15.18 | 45.54 | 30.36 | 1.5 | 6.0 | 9,108 | 10,626 | 15.18 | 60.72 | 30.36 | 1.5 | 6.0 | 138.2 | 52.6 |
| 31d | 76c | 15.18 | 60.72 | 30.36 | 1.5 | 6.0 | 10,626 | 12,144 | 15.18 | 75.90 | 30.36 | 1.5 | 6.0 | 172.2 | 52.6 |
| 32d | 76c | 15.18 | 75.90 | 30.36 | 1.5 | 6.0 | 12,144 | 13,662 | 15.18 | 91.08 | 30.36 | 1.5 | 6.0 | 207.0 | 52.6 |

*Oxyalkylation-susceptible.

TABLE VI

| Ex. No. | Max. temp., °C. | Max. pres., p. s. i. | Time, hrs. | Solubility | | |
|---|---|---|---|---|---|---|
| | | | | Water | Xylene | Kerosene |
| 1c | 125-135 | 20-25 | 1 | (1) | | |
| 2c | 125-135 | 20-25 | 1½ | (2) | | |
| 3c | 125-135 | 20-25 | 3 | (3) | | |
| 4c | 125-135 | 20-25 | 3½ | (3) | | |
| 5c | 125-135 | 20-25 | 3 | (3) | | |
| 6c | 125-135 | 20-25 | 3 | (3) | | |
| 7c | 125-135 | 20-25 | 4 | (3) | | |
| 8c | 125-135 | 20-25 | 4 | (3) | | |
| 9c | 125-135 | 15-20 | 2 | (1) | | |
| 10c | 125-135 | 15-20 | 2¼ | (2) | | |
| 11c | 125-135 | 15-20 | 2½ | (3) | | |
| 12c | 125-135 | 15-20 | 4 | (3) | | |
| 13c | 125-135 | 15-20 | 3½ | (3) | | |
| 14c | 125-135 | 15-20 | 3¾ | (3) | | |
| 15c | 125-135 | 15-20 | 4 | (3) | | |
| 16c | 125-135 | 15-20 | 5 | (3) | | |
| 17c | 125-135 | 10-15 | 1 | (1) | | |
| 18c | 125-135 | 10-15 | 1½ | (2) | | |
| 19c | 125-135 | 10-15 | 2¼ | (3) | | |
| 20c | 125-135 | 10-15 | 3 | (3) | | |
| 21c | 125-135 | 10-15 | 3 | (3) | | |
| 22c | 125-135 | 10-15 | 3½ | (3) | | |
| 23c | 125-135 | 10-15 | 4 | (3) | | |
| 24c | 125-135 | 10-15 | 4½ | (3) | | |
| 25c | 130-135 | 30-35 | 1½ | (1) | | |
| 26c | 130-135 | 30-35 | 2 | (2) | | |
| 27c | 130-135 | 30-35 | 3 | (2) | | |
| 28c | 130-135 | 30-35 | 4 | (3) | | |
| 29c | 130-135 | 30-35 | 4 | (3) | | |
| 30c | 130-135 | 30-35 | 5 | (3) | | |
| 31c | 130-135 | 30-35 | 7 | (3) | | |
| 32c | 130-135 | 30-35 | 8 | (3) | | |
| 33c | 130-135 | 30-35 | 2 | (1) | | |
| 34c | 130-135 | 30-35 | 2½ | (1) | | |
| 35c | 130-135 | 30-35 | 3 | (2) | | |
| 36c | 130-135 | 30-35 | 4 | (3) | | |
| 37c | 130-135 | 30-35 | 4 | (3) | | |
| 38c | 130-135 | 30-35 | 5 | (3) | | |
| 39c | 130-135 | 30-35 | 7 | (3) | | |
| 40c | 130-135 | 30-35 | 8 | (3) | | |
| 41c | 125-130 | 25-35 | 2 | (1) | (3) | (1) |
| 42c | 125-130 | 25-35 | 2½ | (1) | (3) | (1) |
| 43c | 125-130 | 25-35 | 3½ | (1) | (3) | (4) |
| 44c | 125-130 | 25-35 | 4 | (1) | (3) | (3) |
| 45c | 125-130 | 25-35 | 5 | (1) | (3) | (3) |
| 46c | 125-130 | 25-35 | 4¾ | (1) | (3) | (3) |
| 47c | 125-130 | 25-35 | 5½ | (1) | (3) | (3) |
| 48c | 125-130 | 25-35 | 6¾ | (1) | (3) | (3) |
| 49c | 135-140 | 30-35 | 2 | (1) | (3) | (1) |
| 50c | 135-140 | 30-35 | 2¾ | (1) | (3) | (4) |
| 51c | 135-140 | 30-35 | 3 | (1) | (3) | (4) |
| 52c | 135-140 | 30-35 | 4¼ | (1) | (3) | (3) |
| 53c | 135-140 | 30-35 | 5 | (1) | (3) | (3) |
| 54c | 135-140 | 30-35 | 5 | (1) | (3) | (3) |
| 55c | 135-140 | 30-35 | 6¼ | (1) | (3) | (3) |
| 56c | 135-140 | 30-35 | 6½ | (1) | (3) | (3) |
| 57c | 125-135 | 30-35 | 2 | (1) | (3) | (1) |
| 58c | 125-135 | 30-35 | 2½ | (1) | (3) | (3) |
| 59c | 125-135 | 30-35 | 3 | (1) | (3) | (3) |
| 60c | 125-135 | 30-35 | 3¾ | (1) | (3) | (3) |
| 61c | 125-135 | 30-35 | 4 | (1) | (3) | (3) |
| 62c | 125-135 | 30-35 | 4 | (1) | (3) | (3) |
| 63c | 125-135 | 30-35 | 5 | (1) | (3) | (3) |
| 64c | 125-135 | 30-35 | 5½ | (1) | (3) | (3) |
| 65c | 130-135 | 30-40 | 1½ | (1) | (3) | (1) |
| 66c | 130-135 | 30-40 | 2 | (1) | (3) | (4) |
| 67c | 130-135 | 30-40 | 3 | (1) | (3) | (3) |
| 68c | 130-135 | 30-40 | 3½ | (1) | (3) | (3) |
| 69c | 130-135 | 30-40 | 5 | (1) | (3) | (3) |
| 70c | 130-135 | 30-40 | 4 | (1) | (3) | (3) |
| 71c | 130-135 | 30-40 | 4½ | (1) | (3) | (3) |
| 72c | 130-135 | 30-40 | 6 | (1) | (3) | (3) |
| 73c | 130-135 | 15-20 | 2 | (1) | (3) | (1) |
| 74c | 130-135 | 15-20 | 2 | (1) | (3) | (4) |
| 75c | 130-135 | 15-20 | 3 | (1) | (3) | (4) |
| 76c | 130-135 | 15-20 | 4½ | (1) | (3) | (4) |
| 77c | 130-135 | 15-20 | 6 | (1) | (3) | (3) |
| 78c | 130-135 | 15-20 | 5½ | (1) | (3) | (3) |
| 79c | 130-135 | 15-20 | 6½ | (1) | (3) | (3) |
| 80c | 130-135 | 15-20 | 7 | (1) | (3) | (3) |
| 1d | 130-135 | 30-35 | ½ | (4) | (3) | (1) |
| 2d | 130-135 | 30-35 | 1 | (4) | (3) | (1) |
| 3d | 130-135 | 30-35 | 1¼ | (4) | (3) | (1) |
| 4d | 130-135 | 30-35 | 2 | (4) | (3) | (1) |
| 5d | 130-135 | 30-35 | 3 | (1) | (3) | (1) |
| 6d | 130-135 | 30-35 | 1 | (3) | (3) | (3) |
| 7d | 130-135 | 30-35 | 1½ | (3) | (3) | (3) |
| 8d | 130-135 | 30-35 | 2½ | (3) | (1) | (1) |
| 9d | 130-135 | 30-35 | ½ | (3) | (1) | (1) |
| 10d | 130-135 | 30-35 | 1¼ | (4) | (3) | (1) |
| 11d | 130-135 | 30-35 | 2 | (4) | (3) | (1) |
| 12d | 130-135 | 30-35 | 2¾ | (4) | (3) | (1) |
| 13d | 130-135 | 30-35 | 1 | (4) | (3) | (1) |
| 14d | 130-135 | 30-35 | 1½ | (4) | (3) | (1) |
| 15d | 130-135 | 30-35 | 1½ | (4) | (3) | (4) |
| 16d | 130-135 | 30-35 | 2 | (4) | (3) | (1) |
| 17d | 135-140 | 30-35 | ½ | (1) | (3) | (3) |
| 18d | 135-140 | 30-35 | ¾ | (4) | (3) | (3) |
| 19d | 135-140 | 30-35 | ¾ | (4) | (3) | (3) |
| 20d | 135-140 | 30-35 | 1 | (4) | (3) | (3) |
| 21d | 135-140 | 30-35 | 1¾ | (4) | (3) | (3) |
| 22d | 135-140 | 30-35 | 2½ | (3) | (3) | (3) |
| 23d | 135-140 | 30-35 | 3 | (3) | (3) | (3) |
| 24d | 135-140 | 30-35 | 3½ | (3) | (3) | (1) |

TABLE VI—Continued

| Ex. No. | Max. temp., °C. | Max. pres., p. s. i. | Time, hrs. | Solubility | | |
|---|---|---|---|---|---|---|
| | | | | Water | Xylene | Kerosene |
| 25d | 130-135 | 15-20 | ¾ | (1) | (3) | (1) |
| 26d | 130-135 | 15-20 | 1 | (4) | (3) | (1) |
| 27d | 130-135 | 15-20 | 2 | (4) | (3) | (1) |
| 28d | 130-135 | 15-20 | 3 | (4) | (3) | (1) |
| 29d | 130-135 | 15-20 | 1½ | (3) | (3) | (1) |
| 30d | 130-135 | 15-20 | 1¼ | (3) | (1) | (1) |
| 31d | 130-135 | 15-20 | 1¾ | (3) | (1) | (1) |
| 32d | 130-135 | 15-20 | 2½ | (3) | (1) | (1) |

1 Insoluble.
2 Emulsifiable.
3 Soluble.
4 Dispersible.

PART 5

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 5c with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 5c, 20%;
A cyclohexylamine salt of a polypropylated napthalene monosulfonic acid, 24%;
An ammonium salt of a polypropyalted napthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described my invention, what I claim as new and desire to obtain by Letters Patent, is:

1. A process for breaking petroleum emulsions of the water-in-oil type characterized by subjecting the emulsion to the action of a demulsifier including the products obtained in the process of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

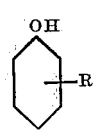

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basis secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

2. A process for breaking petroleum emulsions of the water-in-oil type characterized by subjecting the emulsion to the action of a demulsifier including the products obtained in the process of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

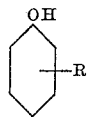

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the further proviso that the ratio of reactants be approximately 1, 2 and 2 respectively; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

3. A process for breaking petroleum emulsions of the water-in-oil type characterized by subjecting the emulsion to the action of a demulsifier including the products obtained in the process of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

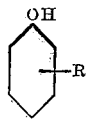

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule; by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

4. A process for breaking petroleum emulsions of the water-in-oil type characterized by subjecting the emulsion to the action of a demulsifier including the products obtained in the process of first condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being derived by reaction between a difunctional monohydric phenol and formaldehyde; said resin being formed in the substantial absence of trifunctional phenols; said phenol being of the formula

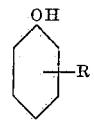

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

5. A process for breaking petroleum emulsions of the water-in-oil type characterized by subjecting the emulsion to the action of a demulsifier including the products obtained in the process of first condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

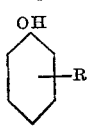

in which R is an aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alhpa-beta alkylene oxide having not more than 4 carbon atoms and selected from the class consisting of ethylene oxide, propylene oxide, butylene oxide, glycide and methylglycide.

6. A process for breaking petroleum emulsions of the water-in-oil type characterized by subjecting the emulsion to the action of a demulsifier including the products obtained in the process of first condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

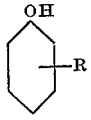

in which R is an aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condenastion product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

7. A process for breaking petroleum emulsions of the water-in-oil type characterized by subjecting the emulsion to the action of a demulsifier including the products obtained in the process of first condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

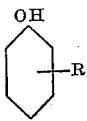

in which R is an aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

8. A process for breaking petroleum emulsions of the water-in-oil type characterized by subjecting the emulsion to the action of a demulsifier including the products obtained in the process of first condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

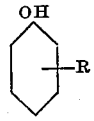

in which R is a para-substituted aliphatic hydrocarbon radical having at least 4 and not more than 14 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom of reaction with a resin molecule; with the added proviso that the ratio of reactants be approximately 1, 2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

9. The process of claim 1 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

10. The process of breaking petroleum emulsions as defined in claim 1 wherein the oxyalkylation step of the manufacturing process is limited to the use of both ethylene oxide and propylene oxide in combination.

11. The process of claim 10 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

12. The process of claim 2 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

13. The process of breaking petroleum emulsions as defined in claim 2 wherein the oxyalkylation step of the manufacturing process is limited to the use of both ethylene oxide and propylene oxide in combination.

14. The process of claim 13 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

15. The process of claim 3 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

16. The process of breaking petroleum emulsions as defined in claim 3 wherein the oxyalkylation step of the manufacturing process is limited to the use of both ethylene oxide and propylene oxide in combination.

17. The process of claim 16 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

18. The process of claim 4 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

19. The process of breaking petroleum emulsions as defined in claim 4 wherein the oxyalkylation step of the manufacturing process is limited to the use of both ethylene oxide and propylene oxide in combination.

20. The process of claim 19 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

21. The process of claim 5 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

22. The process of breaking petroleum emulsions as defined in claim 5 wherein the oxyalkylation step of the manufacturing process is limited to the use of both ethylene oxide and propylene oxide in combination.

23. The process of claim 22 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

24. The process of claim 6 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

25. The process of breaking petroleum emulsions as defined in claim 6 wherein the oxyalkylation step of the manufacturing process is limited to the use of both ethylene oxide and propylene oxide in combination.

26. The process of claim 25 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

27. The process of claim 7 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

28. The process of breaking petroleum emulsions as defined in claim 7 wherein the oxyalkylation step of the manufacturing process is limited to the use of both ethylene oxide and propylene oxide in combination.

29. The process of claim 28 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

30. The process of claim 8 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

31. The process of breaking petroleum emulsions as defined in claim 8 wherein the oxyalkylation step of the manufacturing process is limited to the use of both ethylene oxide and propylene oxide in combination.

32. The process of claim 31 with the proviso that the hydrophile properties of the product of the oxyalkylated condensation reaction employed in the form of a member of the class consisting of (a) the anhydro base as is, (b) the free base, and (c) the salt of hydroxy acetic acid, in an equal weight of xylene are sufficient to produce an emulsion when said xylene solution is shaken vigorously with 1 to 3 volumes of water.

References Cited in the file of this patent

UNITED STATES PATENTS

| Number | Name | Date |
| --- | --- | --- |
| 2,031,557 | Bruson | Feb. 18, 1936 |
| 2,499,365 | De Groote et al. | Mar. 7, 1950 |
| 2,499,368 | De Groote et al. | Mar. 7, 1950 |
| 2,542,011 | De Groote et al. | Feb. 20, 1951 |